June 19, 1956
D. W. SEIFERT
2,751,153
WARM AIR HEATING SYSTEM CONTROL
Filed June 23, 1953
4 Sheets-Sheet 1
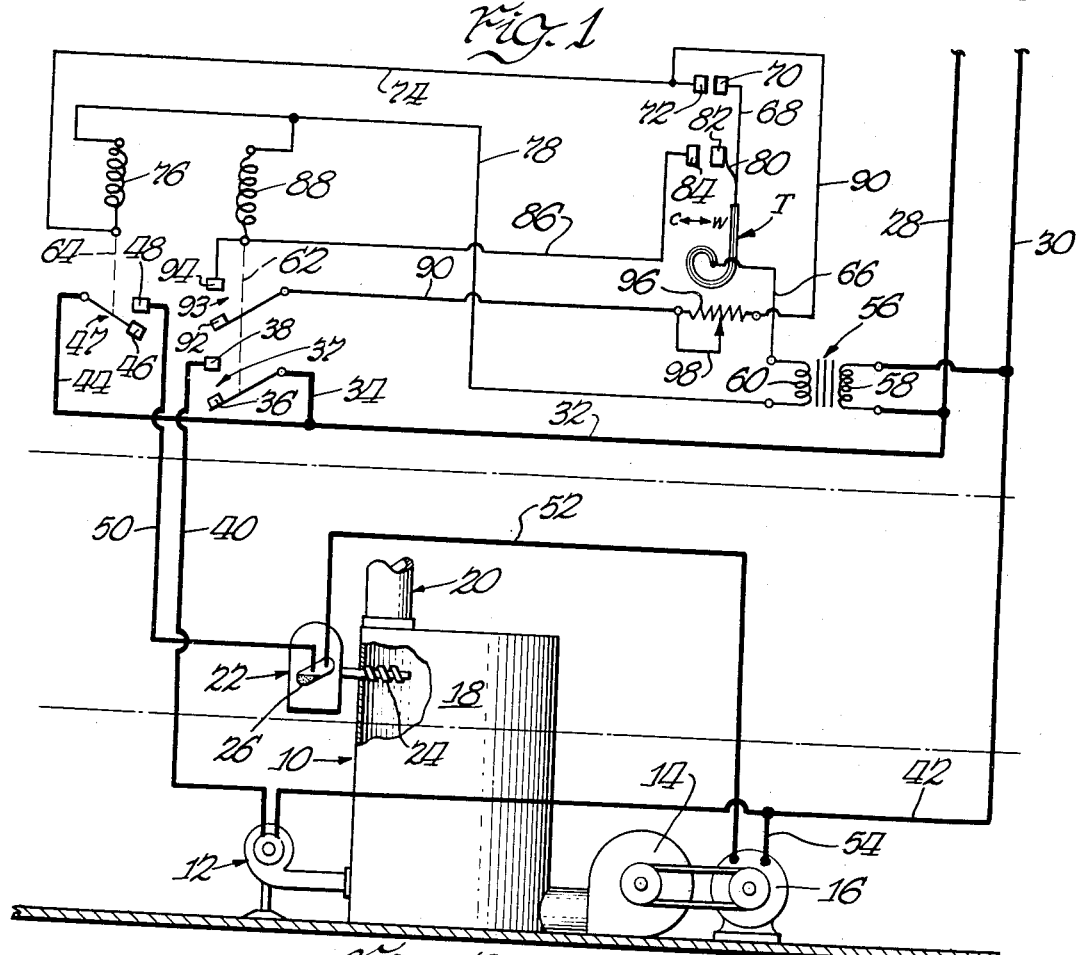
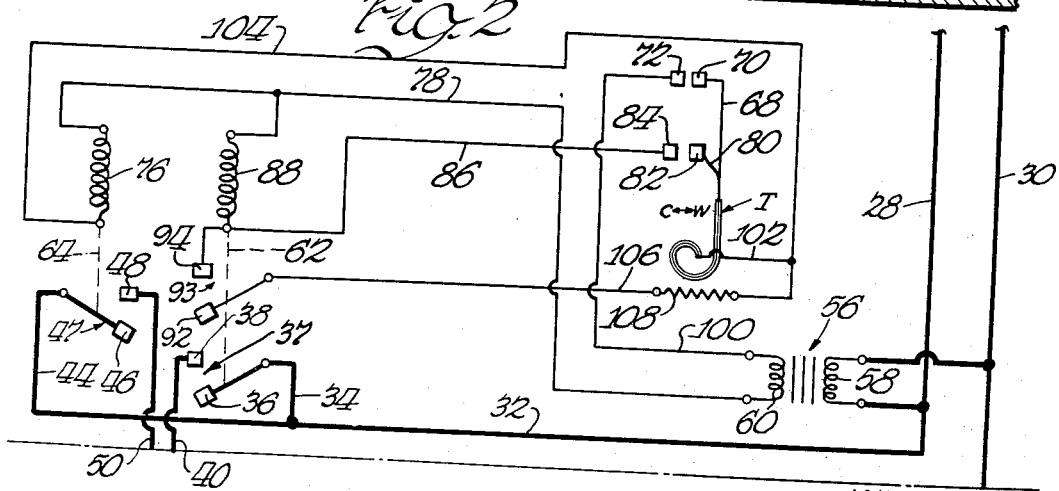
INVENTOR
DONALD SEIFERT
BY Bair, Freeman & Molinare
ATTORNEYS June 19, 1956
D. W. SEIFERT
2,751,153
WARM AIR HEATING SYSTEM CONTROL
Filed June 23, 1953
4 Sheets-Sheet 2
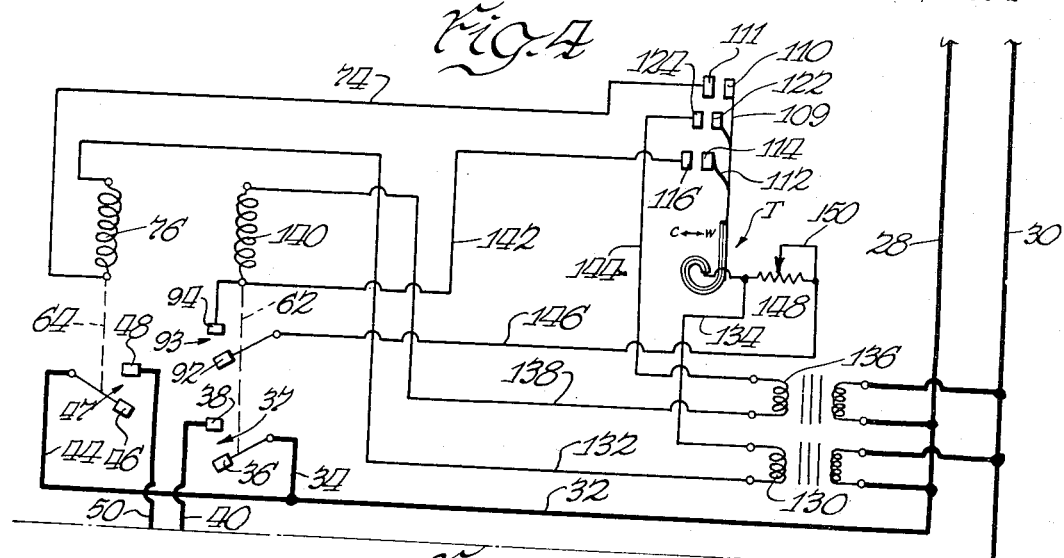
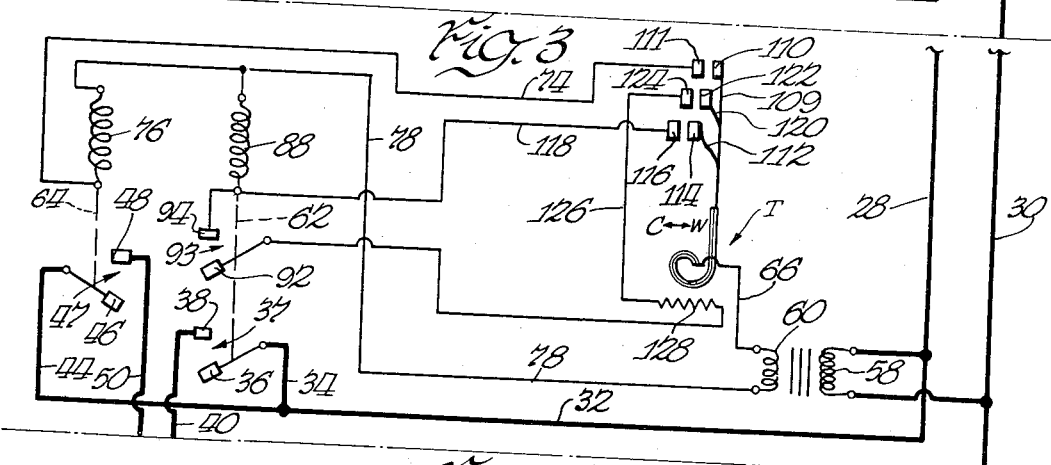
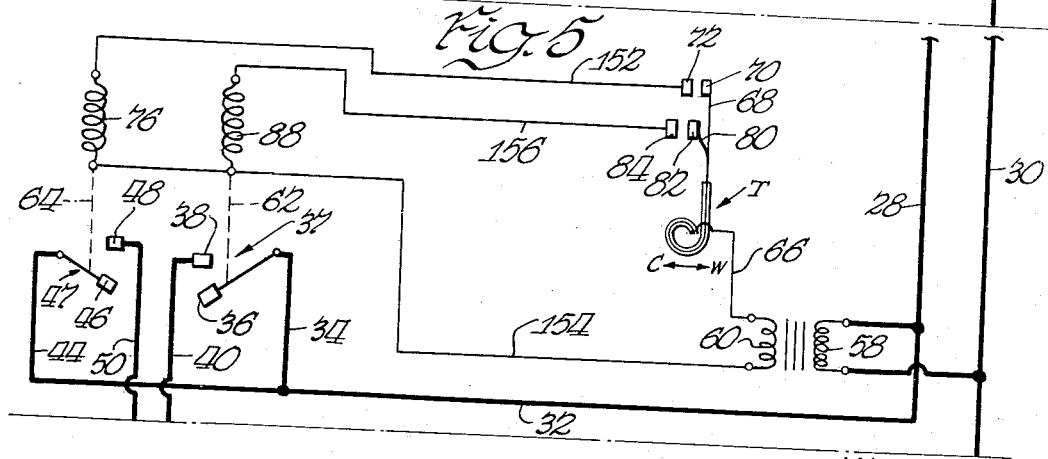
INVENTOR
DONALD SIEFERT
BY Bair, Freeman & Molinare
ATTORNEYS

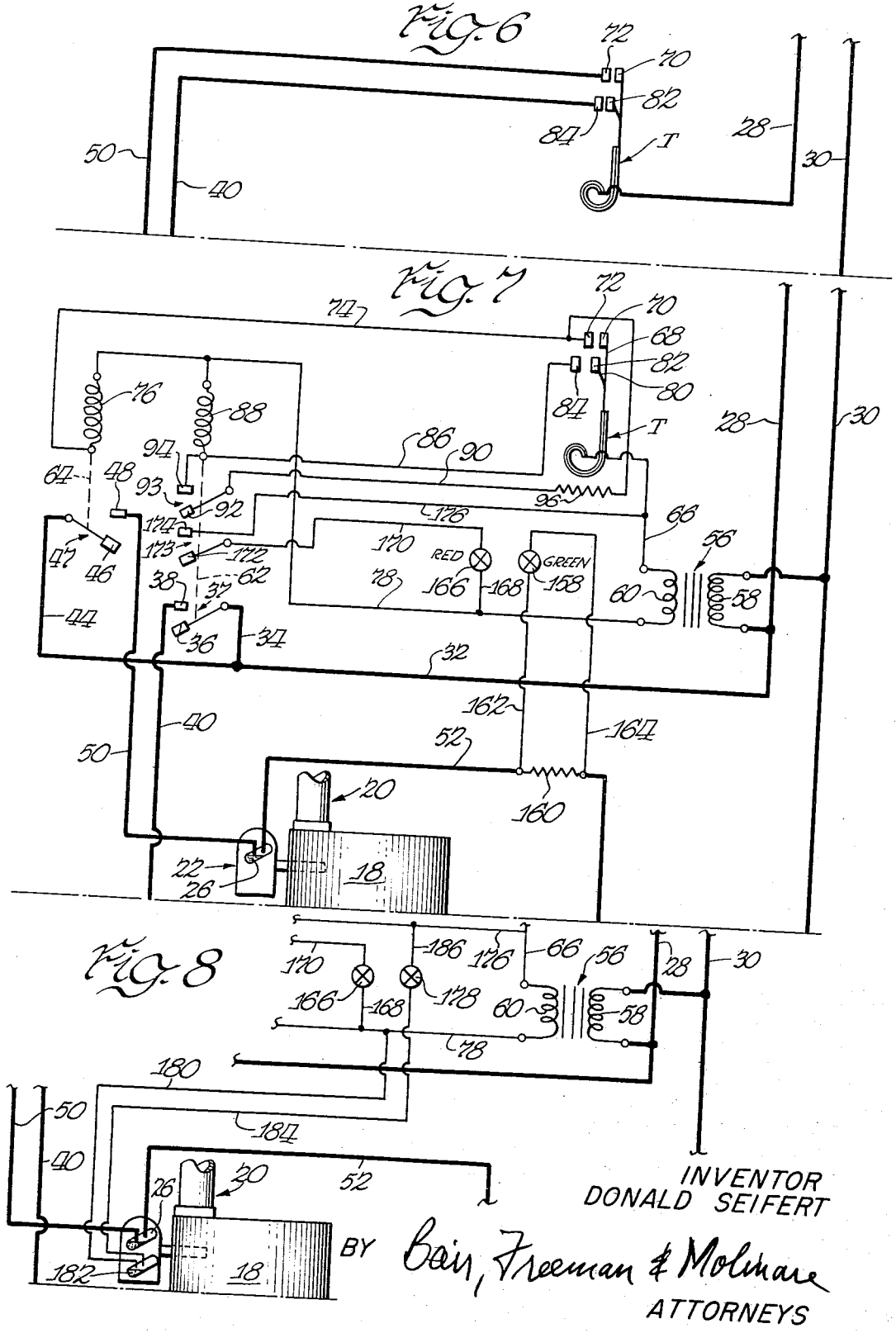

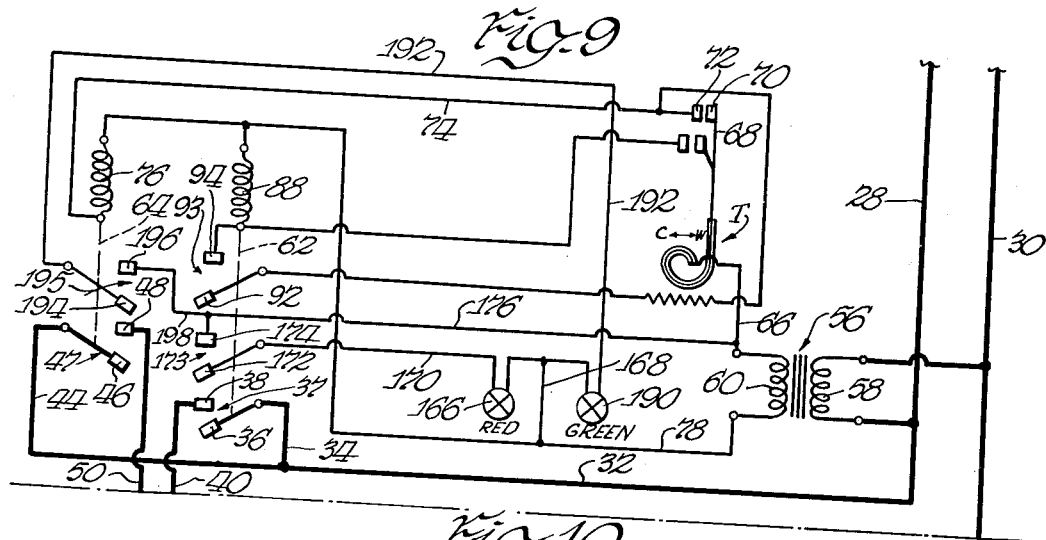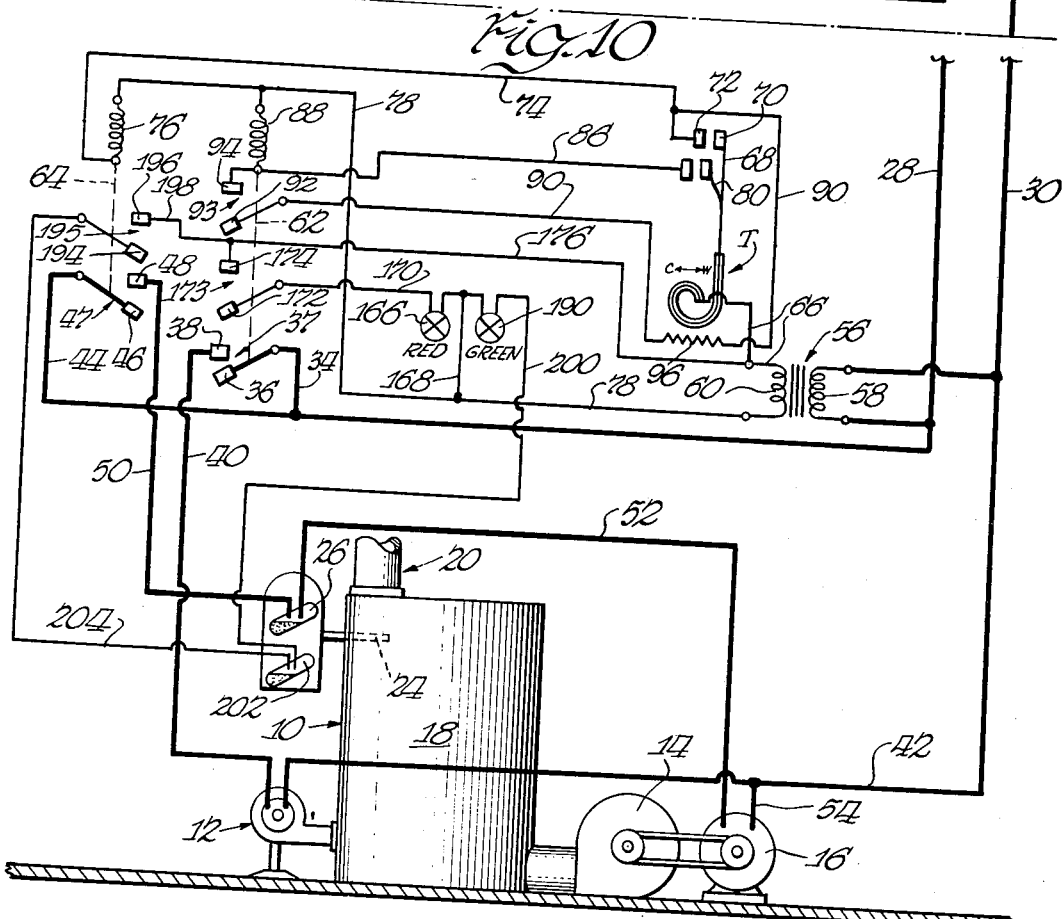

United States Patent Office 2,751,153
Patented June 19, 1956

2,751,153

WARM AIR HEATING SYSTEM CONTROL

Donald W. Seifert, Highland Park, Mich.

Application June 23, 1953, Serial No. 363,637

20 Claims. (Cl. 236—9)

This invention relates to a heating system control or temperature control system and more particularly to a system of controls for a warm air furnace having in combination therewith a chamber wherein warm air may be stored and from whence warm air may be dispensed by a circulator, as required, to the space to be heated by the warm air.

It has been found in the heating of homes and the like with warm air, that the controls for the circulator of the warm air and for the heating means, which may be in the form of an oil burner for example, have been unable to fully control the fluctuations of heat within the home. The failure to properly control the operation of the circulator of warm air often results in first, having an excessive amount of hot air delivered to the space being heated when the thermostat in the space to be heated calls for heat, and secondly, then requiring a large temperature drop from the highest temperature reached in said space being heated, before additional heat is supplied. The "overshooting" of the temperature called for by the space thermostat causes discomfort to the occupants of the space being heated, as does the following large temperature drop required to again initiate circulation of additional heated air.

Attempts have been made to overcome this defect in heating system controls, but such attempts usually have some detrimental feature found therein. One such attempt, which is undesirable, involves the use of a system wherein the circulator runs substantially constantly at a rate dependent upon the heat loss from the space being heated so as to attempt to supply just enough heat to overcome the heat loss, while the burner cycles on and off. In such a system, the burner is turned on and off at a pair of predetermined temperature values in the furnace bonnet wherein the heated air is stored.

Other furnace control systems have been found unsatisfactory, such as a system which involves the use of a thermostat located in the furnace bonnet to control the operation of the blower. The operation of this system requires the use of dampers in order to control the heated air being delivered to the space being heated during various outside weather conditions. In such systems usually the space thermostats and controls are operatively associated only with the burner, and the blower begins to operate as soon as the bonnet temperature rises above a predetermined temperature.

It is one object of this invention to provide a novel method for operating a heating system.

It is another object of this invention to provide a heating system control which permits the burner to operate sufficiently to heat up a large amount of air to be stored within the bonnet of the furnace and to have both the burner and blower turned off simultaneously or substantially simultaneously upon the temperature in the space being heated reaching a predetermined temperature. Then, as the heat dissipates from the space, the temperature fluctuation in said space is operative to cycle the blower on and off to move heated air from the mass of heated air stored in the bonnet into the space to be heated to supply the heat demands of said space. The cycling of the blower continues as long as the temperature of the heated air in the bonnet is maintained above a predetermined temperature. Thereafter, upon the temperature of the heated air in the bonnet falling below a predetermined degree, and if the temperature in the space to be heated falls, the controls are operative to again turn on the burner, and subsequently the blower upon the burner again heating the air in the furnace bonnet.

The use of the above system requires that certain temperature conditions be attained both in the space to be heated and in the furnace bonnet to initiate operation of the burner. Thereafter, upon achieving a certain temperature in the space to be heated, the burner and blower are both turned off and the temperature conditions in both the space to be heated and in the bonnet are operative to control the supplying of heat to the space to be heated, irrespective of the fact that the burner may be turned either on or off.

The operation of the novel system described herein is characterized by the provision of a control which shuts off both the burner and blower simultaneously, or substantially simultaneously, when both the burner and blower have both been operating and upon the temperature in said space attaining a predetermined degree.

It is another object of this invention to provide signal lights with the control system above described which will indicate visually the condition of the heating system, that is, whether or not the thermostat located in the space to be heated is calling for the blower or burner to be on or off.

It is a further object of this invention to provide a novel heating control system which obviates the above noted inadequacies of existing heating control systems and which is characterized by its simplicity and reliability.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which—

Figure 1 is a diagrammatic drawing of a heating system provided with controls for operating in accordance with my invention.

Figures 2, 3 and 4 are diagrammatic drawings of modified forms of the controls for the heating system shown in Figure 1.

Figure 5 is a diagrammatic drawing of a simplified control system for the heating system shown in Figure 1.

Figure 6 is a diagrammatic drawing of a simplified control system for the heating system shown in Figure 1 and consists of a room thermostat multi-contact control interposed between the source of power and the burner and blower of the heating system.

Figure 7 is a diagrammatic drawing of a heating system provided with controls therefore of the type shown in Figure 1, and further provided with signal-lights operatively associated with the burner and blower of the heating system.

Figures 8, 9 and 10 are diagrammatic drawings of modified forms of heating systems and controls therefor, of the type shown in Figure 1, provided with signal-lights operatively associated with the burner and blower of the heating system.

Referring now to the drawings, there is shown in Figure 1 a heating system for a house or the like comprising a warm air furnace generally indicated at 10, a fuel burner and fuel pump 12, a blower 14, a blower motor 16 and a warm air chamber or bonnet 18 in the furnace 10 within which warm air may be stored. There are provided duct means 20 leading from bonnet 18 through which warm air may be blown to desired areas. There is also provided a furnace thermostat generally indicated at 22 which includes a temperature measuring element 24 positioned in the bonnet 18 and a switch 26, of the mercury type, operatively associated with the temperature measuring element 24. The switch 26 is moved to a closed position upon the temperature in said bonnet 18 being elevated to a first predetermined degree, and said switch 26 is designed to be opened, after it has first been closed, upon the temperature in said bonnet 18 falling to a second temperature of no higher degree than the first temperature at which the switch was closed. This type of switch is well known in the art and needs no further description herein.

A source of power is provided for operating the burner and fuel pump 12 and the blower motor 16. The source of power and circuits carrying source voltage are shown in heavy black lines in the drawings as distinguished from the control circuits which operate usually at a lesser voltage and are shown in the drawings in lighter lines. The power is carried by lines 28 and 30. There are provided separate electric circuits for the burner 12 and the blower motor 16. The circuit for burner 12 includes lines 28, 32 and 34, contacts 36 and 38 of a switch 37, and lines 40, 42, and 30. The circuit for the blower motor 16 includes lines 28, 32 and 44, contacts 46 and 48, of a switch 47, line 50, switch 26, and lines 52, 54, 42, and 30.

The pairs of contacts 36 and 38, and 46 and 48, of switches 37 and 47, are opened and closed by controls which are hereinafter described.

In the control for the heating system thus described there is provided a room or space thermostat T located in the room or space to be heated. The space thermostat T is provided with a plurality of sets of contacts which make and break in reverse order in response, respectively, to falling and rising temperatures in the space to be heated.

The space thermostat T is part of the control system for the heating system and the details thereof will be described hereinbelow in conjunction with the description of the control system.

Controls in Figure 1

The controls for actuating switches 37 and 47 to open and close the contacts thereof are powered by any appropriate means such as transformer 56 having a primary 58, connected to lines 28 and 30, and a secondary 60 for supplying power to the control circuits. The switches are normally open as shown in Figure 1 and may be biased to open position by springs or the like (not shown) as is well known in the art. Solenoid plungers 62 and 64 are used for closing switches 37 and 47 respectively.

The circuit for operating solenoid plunger 64 includes transformer secondary 60, line 66, thermostat T, leaf 68, contacts 70 and 72, line 74, solenoid coil 76, and line 78. The circuit for operating solenoid plunger 62 includes transformer secondary 60, line 66, thermostat T, leaf 80, contacts 82 and 84, line 86, solenoid coil 88, and line 78.

In addition to the circuits for operating the solenoid plungers 62 and 64 there is provided a holding circuit. The holding circuit includes transformer secondary 60, line 66, thermostat T, leaf 68, contacts 70 and 72, line 90, contacts 92 and 94 of switch 93, solenoid coil 88, and line 78.

The holding circuit may have a heater therein, as shown by resistance 96 in line 90. The heater 96 is positioned adjacent thermostat T for a purpose which will become apparent hereinafter. The heater 96 may be provided with a control 98 which varies the amount and rate of heat developed in heater 96.

The thermostat T is so designed that when the temperature in the space, within which the thermostat T is located, is falling, contact 70 engages contact 72 before contact 82 engages contact 84. Then, if the temperature continues to fall, the contact 82 will engage contact 84. After both sets of contacts have been engaged, if the temperature rises in the space, the contacts 82 and 84 break first. And thereafter, if the temperature continues to rise, the contacts 70 and 72 separate. Of course, by proper design, it can be arranged so that contacts 70 and 72 engage at a predetermined temperature and that contacts 82 and 84 engage at a second predetermined temperature, a certain temperature increment below the first predetermined temperature. Similarly, after the second set of contacts separate, the first set will break upon the temperature rising the same temperature increment.

Operation of controls of Figure 1

Assume that the controls and circuits are in the condition shown in Figure 1. As the temperature of the space in which thermostat T is located drops, and passes a first predetermined temperature, contacts 70 and 72 close. The solenoid coil 76 is energized by voltage from transformer secondary 60 (usually low voltage about 25 volts) and operates solenoid plunger 64 to close switch 47 located in the blower motor circuit. Since switch 26 is open, nothing happens. If the temperature in the space continues to fall, the contacts 82 and 84 close. This energizes solenoid coil 88 which operates solenoid plunger 62 to close switches 37 and 93.

The closing of switch 37 starts the burner 12 for heating air within furnace 10. After the temperature of the heated air in bonnet 18 has reached a predetermined temperature the switch 26 closes. This completes the blower circuit and the blower then begins delivering heated air through duct means 20 to the space to be heated.

The burner 12 is designed to heat the air in bonnet 18 at a very rapid rate so that, although the blower 14 is delivering heated air to the space to be heated, there is being accumulated in bonnet 18 a large amount of heated air. As the temperature in the space to be heated rises to a second predetermined temperature, the thermostat T operates to open contacts 82 and 84.

As was explained earlier, when solenoid coil 88 is energized, the solenoid plunger 62 operates to close switches 37 and 93. The closing of switch 93 prepares a holding circuit which is adapted to maintain solenoid coil 88 energized even after contacts 82 and 84 have been separated. This holding circuit includes therein the contacts 70 and 72.

The holding circuit also has therein a heater 96 positioned adjacent thermostat T. When the contacts 82 and 84 are closed the holding circuit is prepared but not energized. When the contacts 82 and 84 open, then the holding circuit is energized. Upon energization of the holding circuit, heater 96 heats up and increases the temperature immediately adjacent the thermostat T. If the temperature increase adjacent the thermostat is sufficient to raise the local temperature above the first predetermined temperature, then the contacts 70 and 72 open, thus de-energizing the solenoid coils 76 and 88 and de-energizing the holding circuit, whereupon the control circuits return to the condition shown in Figure 1.

Thereafter, as the temperature in the space to be heated again falls below the first predetermined temperature the contacts 70 and 72 again close first and again operate to close switch 47. However, this time the switch 26 is closed because the temperature of the heated air in the bonnet 18 is sufficient to close switch 26. Thus, when contacts 70 and 72 close and cause switch 47 to close, the blower circuit is closed and heated air is again delivered by the circulator to the space to be heated. As the temperature rises in the space to said first predetermined temperature the circulator is again shut off. This cycling of the blower on and off continues as long as the temperature of the heated air in the bonnet 18 is sufficient to keep the switch 26 closed.

After all the heated air in bonnet 18 has been dissipated and switch 26 opens, then the entire system is in the original condition shown in Figure 1 and the same procedure as described above is repeated.

By varying the control 98, the rate of heat supplied by heater 96 can be controlled so as to vary the rapidity with which contacts 70 and 72 are opened after contacts 82 and 84 are opened. During this interval between the opening of the two sets of contacts associated with the thermostat the burner 12 and circulator 14 continue to operate and upon the opening of contacts 70 and 72 the burner 12 and circulator 14 are shut off simultaneously.

The controls in Figure 2

The controls in Figure 2 are substantially the same as those shown in Figure 1. There is a rewiring of the thermostat T in Figure 2 and this rewiring is such that the circuit for operating the solenoid plunger 64 includes transformer secondary 60, line 100, contacts 72 and 70, leaf 68, thermostat T, line 102, line 104, solenoid coil 76, and line 78. The circuit for operating solenoid plunger 62 includes transformer secondary 60, line 100, contacts 72 and 70, leaf 68, thermostat T, leaf 80, contacts 82 and 84, line 86, solenoid coil 88 and line 78.

The holding circuit in Figure 2 comprises transformer secondary 60, line 100, contacts 72 and 70, leaf 68, thermostat T, line 102, line 106, contacts 92 and 94, solenoid coil 88, and line 78. The holding circuit has a heater 108 therein. The heater 108 is positioned adjacent thermostat T and is designed to give a predetermined rise in temperature upon the holding circuit being energized. The predetermined rise in temperature is sufficient to heat thermostat T to cause contacts 72 and 70 to separate quickly after contacts 82 and 84 have separated. The operation of the controls in Figure 2 is substantially the same as that described in Figure 1, and will be understood by reference to the mode of operation of Figure 1 described hereinabove.

The controls of Figure 3

In Figure 3, the thermostat T that is in the room or space to be heated is provided with three sets of contacts, as contrasted with the room thermostats in Figures 1 and 2 which were provided with two sets of contacts. In Figure 3, the circuit for operating the solenoid plunger 64 includes transformer secondary 60, line 66, thermostat T, leaf 109, contacts 110 and 111, line 74, solenoid coil 76, and line 78. The circuit for operating solenoid plunger 62 includes transformer secondary 60, line 66, thermostat T, leaf 112, contacts 114, and 116, line 118, solenoid coil 88 and line 78. The holding circuit includes transformer secondary 60, line 66, thermostat T, leaf 120, contacts 122 and 124, line 126, contacts 92 and 94, solenoid coil 88 and line 78. The holding circuit may have a heater 128 therein, as shown, positioned adjacent thermostat T.

The difference in the circuit shown in Figure 3 over that shown in Figures 1 and 2 is the use of the additional set of contacts 122 and 124 on thermostat T in the holding circuit. Previously, the initial set of contacts to make, which were in the circuit for solenoid coil 76, also served as contacts in the circuit for the holding circuit. In the form shown in Figure 3 a separate set of contacts are provided for the holding circuit. Thus, in the operation of Figure 3, if heater 128 heats up thermostat T sufficiently, the pairs of contacts 122 and 124, and 110 and 111 break substantially simultaneously and turn off both the burner and the blower substantially simultaneously. The heater 128 may be designed to produce only sufficient heat to cause contacts 122 and 124 to separate and this results in the turning off of the burner, thus permitting the blower to operate until sufficient heat is delivered to cause contacts 110 and 111 to separate. This permits the turning off of the burner somewhat before the blower and may be found more satisfactory in certain types of installations.

If the contacts 110 and 111 remain engaged after contacts 122 and 124 are broken, the blower continues to operate. Thereafter, the cycling of the blower on and off is responsive to the rising and falling of the temperature in the space to be heated. After the excess heated air in the bonnet 18 of the furnace has been entirely dissipated, the entire operation cycle again begins and is substantially the same as the operation described for Figures 1 and 2.

The controls of Figure 4

The controls in Figure 4 are substantially the same as those shown in Figure 3 except that two transformers are provided for delivering the control voltage to the various control circuits and the heater in the holding circuit is provided with a variable control similar to the variable control shown in Figure 1.

In Figure 4, the circuit for operating solenoid plunger 64 includes a transformer secondary 130, line 132, solenoid coil 76, line 74, contacts 111 and 110, leaf 109, thermostat T and line 134. The circuit for operating solenoid plunger 62 includes a transformer secondary 136, line 138, solenoid coil 140, line 142, contacts 116 and 114, leaf 112, thermostat T, leaf 120, contacts 122 and 124, and line 144. The holding circuit includes transformer secondary 136, line 138, solenoid coil 140, contacts 94 and 92, line 146, thermostat T, leaf 120, contacts 122 and 124, and line 144.

In this arrangement, the solenoid coil 76 is actuated by a circuit containing transformer secondary 130, while solenoid coil 140 and the holding circuit are energized by the transformer secondary 136.

The holding circuit has a heater 148 therein provided with a control 150 which is for varying the amount and rate of heat produced by heater 148. By means of control 150, it may be provided that sufficient heat is developed by heater 148 to cause the sets of contacts 110 and 111, and 124 and 122 to separate substantially simultaneously, or, if desired, the amount of heat delivered by heater 148 can be controlled to cause only contacts 122 and 124 to separate, upon the holding circuit being energized, which occurs after the third set of contacts 114 and 116 have been separated. Otherwise, the function of the control circuits defined herein is substantially the same as the control circuits defined in the figures earlier described.

The controls of Figure 5

In Figure 5, there is provided a room thermostat T with two pairs of sets of contacts associated therewith. The first pair of sets of contacts to engage and make controls the blower, while the second set of contacts to make, in response to falling temperatures, controls the burner. The temperature increment between the temperatures of closing, or make, of the first set of contacts and of the second sets of contacts is designed to be of such a magnitude that as the heated air is delivered to the space to be heated by the blower, the rapidity of the temperature rise within the space causes the two sets of contacts to separate substantially simultaneously, so as to turn off both the blower and the burner substantially simultaneously. Thereafter, in response to falling temperatures, the blower is turned on first and consequently heated air is delivered to the space to be heated before the blower is turned on. In this way the blower is cycled on and off until the excess heated air in the bonnet 18 of the furnace is completely dissipated. Thereafter the entire cycle is repeated. In this form of control the holding circuit has been eliminated.

Referring to Figure 5, the circuit for the solenoid coil 76 which operates the solenoid plunger 64 includes transformer secondary 60, line 66, thermostat T, leaf 68, contacts 70 and 72, line 152, solenoid coil 76, and line 154. The circuit for operating solenoid plunger 62 includes transformer secondary 60, line 66, thermostat T, leaf 80, contacts 82 and 84, line 156, solenoid coil 88 and line 154.

The controls of Figure 6

Using the same operational concept set forth above in the description of Figure 5, it is intended in this form of the invention to use the thermostat T, located in the room or space to be heated, directly in the energizing circuits for the burner and the blower. In that way the control circuits are eliminated and the pairs of sets of contacts associated with thermostat T function the same as the switches in the energizing circuits for the burner and the blower previously described. Thus in Figure 6 there is interposed between power line 28 and the blower and the burner a thermostat T having two pairs of sets of contacts associated therewith. In response to falling temperature, the first set of contacts 70 and 72 close, or make, and thereafter the second set of contacts 82 and 84 close or make. The first set of contacts 70 and 72 are operative to turn on the blower if the furnace thermostat switch 26 is closed, and the second set of contacts 82 and 84 are operative to close the circuit to the burner. After sufficient heat has been delivered to the space to be heated, the contacts 82 and 84 separate, or break, first, thus turning off the burner. The rapidly rising temperature in the space to be heated also causes contacts 70 and 72 to separate shortly thereafter thus causing the burner and the blower to be turned off substantially simultaneously. Thereafter, in response to falling temperatures, contacts 70 and 72 engage and additional heated air is delivered by the blower as long as switch 26 is closed. The cycling of the blower on and off in response to falling and rising temperatures continues until all of the air stored in the bonnet 18 of the burnace is dissipated, after which the entire cycle is repeated.

Figure 7

The arrangement herein of energizing circuits for the burner and blower and control circuits therefor is substantially the same as that shown in Figure 1. The modification herein comprises the providing of signal lights for showing when the blower and burner circuits are energized. When one or both of the lights are on they indicate visually whether or not the furnace has been turned on and whether the blower has been turned on by the room thermostat and the occupant then may determine whether it will do any good to turn up the thermostat for the purposes of starting the furnace.

Furthermore, if the signal lights are housed adjacent the thermostat they also serve as heaters and cause the contacts carried by the thermostat to make at one temperature and break at a slightly lower temperature, due to the additional heat supplied to the thermostat by the light bulbs. Thus, the use of signal bulbs provides means for making the thermostat more sensitive.

In Figure 7 there is provided a green signal-light 158 for showing when the blower circuit is closed or energized. The circuit for the green signal-light comprises a resistance 160 in line 52 of the blower circuit and line 162, signal-light 158, and line 164 shunted around said resistance 160.

A red signal-light 166 is provided for showing when the burner circuit is closed. The circuit for the red signal-light includes a switch which is actuated by solenoid plunger 62 simultaneously with switches 37 and 93. The circuit for the red signal-light comprises transformer secondary 60, line 78, line 168, signal-light 166, line 170, contacts 172 and 174 of switch 173, line 176 and line 166.

Figure 8

In Figure 8, the red signal-light 166 for the burner circuit is wired as shown in Figure 7, but an alternative circuit is used for a green signal-light 178. Furthermore, in this modification the green signal-light 178 merely is to show whether or not the air in bonnet 18 of the furnace is hot enough, so that if and when the blower is turned on the blower will deliver heated air. The alternative circuit for green signal-light 178 is shunted across the transformer secondary 60 and uses a switch 182 therein which is actuated simultaneously with the furnace thermostat switch 26 and is similar thereto. This alternative circuit for signal-light 178 includes transformer secondary 60, line 78, line 180, switch 182, line 184, signal-light 178, line 186, line 176, and line 66.

Figure 9

In Figure 9 circuits are provided for signal-lights for showing whether or not the control-operated switches in the burner and blower circuits are opened or closed, without regard to whether the furnace thermostat switch is opened or closed. If the signal-light 166 for the burner circuit is on, that means that the burner should be operating. If the signal-light 190 for the blower circuit is on, that means that the blower should be operating if the temperature of the air in bonnet 18 of the furnace is high enough to close switch 26.

The circuit for signal-light 166 includes transformer secondary 60, line 78, line 168, signal-light 166, line 170, contacts 172 and 174 of switch 173, line 176, and line 66. The circuit for signal-light 190 includes transformer secondary 60, line 78, line 168, signal-light 190, line 192, contacts 194 and 196 of switch 195 (which switch is actuated by solenoid plunger 64 simultaneously with switch 47), line 198, line 176, and line 66.

Figure 10

In Figure 10 there is a modification over Figure 9 in the circuit for the signal-light 190 associated with the blower circuit. In this modification the signal-light 190 for the blower circuit indicates whether or not the blower circuit is energized, while in Figure 9 the signal-light 190 merely indicated if the control-operated switch 47 in the blower circuit was opened or closed.

In Figure 10, the circuit for signal-light 166 is the same as in Figure 9. The circuit for signal-light 190 comprises transformer secondary 60, line 78, line 168, signal-light 190, line 200, switch 202 (which is actuated simultaneously with furnace thermostat switch 26 and is similar thereto), line 204, contacts 194 and 196 of switch 195 (which switch is actuated by solenoid plunger 64 simultaneously with switch 47), line 198, line 176, and line 66.

In the forms shown in Figures 7 to 10, it is intended that the signal lights which are associated with the blower and burner circuits be housed within the same housing that encloses the thermostat T and that the lights be positioned closely adjacent thermostat T so that the heat from the lights affect the thermostat in the manner described hereinabove. The heat from the lights produces an apparent temperature adjacent the thermostat T which is slightly higher than the actual temperature in the space being heated. Since the delivery of heated air to the space to be heated is brought about by the flow of heated air into said space, the response of thermostat T to an apparent temperature slightly higher than the actual temperature in the space to be heated is desirable, because the apparent temperature actually anticipates the reaching of the desired temperature and the desired temperature is probably reached by reason of the influx of circulating heated air that has not yet had a chance to exert its influence upon the temperature of the space.

It will be understood that any of the modifications shown in one figure herein may be incorporated with the system shown in any other figure where the modification is not incompatible with the system to which it is to be added or is not incompatible with the purposes or results to be achieved by the system to be modified.

While there has been shown and described particular embodiments of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. In a heating system, a warm air furnace including a fuel burner and a warm air chamber in which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch being opened upon the temperature in said warm air chamber falling to a second value no greater than said first value, a blower for blowing the warm air from said warm air chamber through a space to be heated by said warm air, a space thermostat in said space to be heated, said space thermostat including two sets of contacts that make and break in reverse order in response to falling and rising temperatures affecting said thermostat, a source of electrical power for operating said heater and said blower, said heater and said blower each being connected to said source of power by means of separate electric circuits, the electric circuits for said heater and said blower each having a control switch therein, said furnace thermostat switch being in the electric circuit for said blower, means operative upon the first set of contacts of said space thermostat being made for closing the control switch in said blower circuit, means operative upon the second set of contacts of said space thermostat being made for closing the control switch in said burner circuit, a holding circuit which is prepared simultaneously with the closing of the control switch in said burner circuit and which is opened only after it has been prepared and upon the first set of contacts being thereafter broken, said holding circuit being operative to keep the control switch in said burner circuit closed and the holding circuit prepared after the second set of contacts break and before said first set of contacts break, and a heater in said holding circuit positioned adjacent the space thermostat and operative to heat rapidly upon the second set of contacts breaking, to cause said space thermostat to respond thereto so as to quickly break said first set of contacts after said second set of contacts is broken, the breaking of said first set of contacts, after both the first and second sets of contacts have been made and after the second set of contacts has been broken, being operative to simultaneously break both the burner and the blower circuits.

2. In a heating system, a warm air furnace including a fuel burner and a warm air chamber in which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch being opened upon the temperature in said warm air chamber falling to a second value no greater than said first value, a blower for blowing the warm air from said warm air chamber through a space to be heated by said warm air, a space thermostat in said space to be heated, said space thermostat including two sets of contacts that make and break in reverse order in response to falling and rising temperatures affecting said thermostat, a source of electrical power for operating said heater and said blower, said heater and said blower each being connected to said source of power by means of separate electric circuits, the electric circuits for said heater and said blower each having a control switch therein, said furnace thermostat switch being in the electric circuit for said blower, means operative upon the first set of contacts of said space thermostat being made for closing the control switch in said blower circuit, means operative upon the second set of contacts of said space thermostat being made for closing the control switch in said burner circuit, a holding circuit which is prepared simultaneously with the closing of the control switch in said burner circuit and which is opened only after it has been prepared and upon the first set of contacts being thereafter broken, said holding circuit being operative to keep the control switch in said burner circuit closed and the holding circuit prepared after the second set of contacts break and before said first set of contacts break, a heater in said holding circuit positioned adjacent the space thermostat and operative to heat rapidly upon the second set of contacts breaking, to cause said space thermostat to respond thereto so as to quickly break said first contacts after said second set of contacts is broken, the breaking of said first set of contacts, after both the first and second sets of contacts have been made and after the second set of contacts has been broken, being operative to simultaneously break both the burner and the blower circuits, whereupon said blower is prevented from delivering an excess of air to the space to be heated, and whereupon said warm air chamber retains an amount of heated air therein at a temperature higher than said first temperature value at which the furnace thermostat is operative to close the switch associated therewith, said first set of contacts thereafter being made by operation of the space thermostat when the temperature in said space falls below a predetermined value, whereupon additional air is delivered to said space from said warm air chamber, said additional warm air being operative to raise the temperature in said space and to prevent said second set of contacts from making and also being operative to cause the thermostat to again break said first contacts, said repeated making and breaking of the first set of contacts being continued as the temperature in said space is dissipated until the temperature in said warm air chamber falls below said second temperature value.

3. In a heating system, a warm air furnace including a fuel burner and a warm air chamber in which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch being opened upon the temperature in said warm air chamber falling to a second value no greater than said first value, a blower for blowing the warm air from said warm air chamber through a space to be heated by said warm air, a space thermostat in said space to be heated, said space thermostat including three sets of contacts that make and break in reverse order in response to falling and rising temperatures affecting said thermostat, a source of electrical power for operating said heater and said blower, said heater and said blower each being connected to said source of power by means of separate electric circuits, the electric circuits for said heater and said blower each having a control switch therein, said furnace thermostat switch being in the electric circuit for said blower, means operative upon the first set of contacts of said space thermostat being made for closing the control switch in said blower circuit, means operative upon the third set of contacts being made for closing the control switch in said burner circuit, a holding circuit which is prepared in part upon the second set of contacts of said space thermostat being made, said holding circuit thereafter being fully prepared by the closing of a holding circuit switch simultaneously with the closing of the control switch in said burner circuit, said holding circuit being opened only after it has been prepared and after both the second and the third sets of contacts have been broken, said holding circuit being operative to keep the control switch in said burner circuit closed and the holding circuit prepared after the third set of contacts has been broken and before the second set of contacts is broken, a heater in said holding circuit positioned adjacent the space thermostat and operative after the breaking of the third set of contacts to heat said thermostat to cause said thermostat to respond thereto to break others of said sets of contacts, the breaking of said second set of contacts, after all three sets of contacts have been made and after the third set of contacts has been broken, being operative to break the burner circuit, and the breaking of both the second and first sets of contacts, after all three sets of contacts have been made and after the third set of contacts has been broken, being operative to substantially simultaneously break both the burner and the blower circuits.

4. In a heating system, a warm air furnace including a fuel burner and a warm air chamber in which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch being opened upon the temperature in said warm air chamber falling to a second value no greater than said first value, a blower for blowing the warm air from said warm air chamber through a space to be heated by said warm air, a space thermostat in said space to be heated, said space thermostat including three sets of contacts that make and break in reverse order in response to falling and rising temperatures affecting said thermostat, a source of electrical power for operating said heater and said blower, said heater and said blower each being connected to said source of power by means of separate electric circuits, the electric circuits for said heater and said blower each having a control switch therein, said furnace thermostat switch being in the electric circuit for said blower, means operative upon the first set of contacts of said space thermostat being made for closing the control switch in said blower circuit, means operative upon the third set of contacts being made for closing the control switch in said burner circuit, a holding circuit which is prepared in part upon the second set of contacts of said space thermostat being made, said holding circuit thereafter being fully prepared by the closing of a holding circuit switch simultaneously with the closing of the control switch in said burner circuit, said holding circuit being opened only after it has been prepared and after both the second and the third sets of contacts have been broken, said holding circuit being operative to keep the control switch in said burner circuit closed and the holding circuit prepared after the third set of contacts has been broken and before the second set of contacts is broken, a heater in said holding circuit positioned adjacent the space thermostat and operative after the breaking of the third set of contacts to heat said thermostat to cause said thermostat to respond thereto to break others of said sets of contacts, the breaking of said second set of contacts, after all three sets of contacts have been made and after the third set of contacts has been broken, being operative to break the burner circuit, the breaking of both the second and first sets of contacts, after all three sets of contacts have been made and after the third set of contacts has been broken, being operative to substantially simultaneously break both the burner and blower circuits, and means for selectively varying the amount and rate of heat produced by the heater in the holding circuit, whereby said heater is operative to either turn off the burner alone, or the burner and blower substantially simultaneously together, upon the temperature in said space reaching a predetermined level.

5. In a heating system, a warm air furnace including a fuel burner and a warm air chamber within which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch opening upon the temperature in said warm air chamber falling to a second value no greater than said first value, a blower for blowing the warm air from said warm air chamber through a space to be heated by said warm air, a space thermostat in said space to be heated, said space thermostat including a plurality of sets of contacts that make in a predetermined sequence and break in reverse order to the order of make in response, respectively, to falling and rising temperatures affecting said thermostat, a source of electric power for operating said heater and said blower, said heater and said blower each being connected to said source of power by a separate electric circuit having a control switch therein, said furnace thermostat switch being in said electric circuit for said blower, means operative, upon the making of the first of said predetermined sequence of the sets of contacts that make, for closing a control circuit that operates the control switch in said blower circuit, means operative, upon the making of the last of said predetermined sequence of the sets of contacts that make, for closing of a control circuit that operates the burner switch and for preparing a holding circuit, said holding circuit being operative to keep the control switch in said burner circuit and the holding circuit prepared after said last set of contacts of said predetermined sequence breaks, said holding circuit including therein a set of contacts on said space thermostat, other than said last set of contacts to make in said predetermined sequence, a heater in said holding circuit positioned adjacent the space thermostat and operative, upon said holding circuit being energized, to cause said thermostat to respond thereto to break at least one of said control circuits which have a set of space thermostat contacts interposed therein.

6. In a heating system, a warm air furnace including a fuel burner and a warm air chamber within which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch opening upon the temperature in said warm air chamber falling to a second value no greater than said first value, a blower for blowing the warm air from said warm air chamber through a space to be heated, a space thermostat in said space to be heated, said space thermostat including two sets of contacts that make and break in reverse order in response, respectively, to falling and rising temperatures affecting said thermostat, a source of electric power for operating said heater and said blower, said heater and said blower being electrically coupled to said source of power by separate electric circuits, the first set of said two sets of contacts of said space thermostat being in the circuit for said blower and the second set of contacts being in the electric circuit for said burner, said furnace thermostat switch being in the electric circuit for said blower, means operative, upon the first set of contacts of said space thermostat being made, for closing, in part, said blower circuit, means operative upon the second set of contacts of said space thermostat being made, for closing the burner circuit, said second set of contacts being broken upon the temperature in said space being elevated to a first predetermined level, said first set of contacts being broken upon the temperature in said space being elevated to a second predetermined level above said first predetermined level at which the second set of contacts break, and the first set of contacts being operative thereafter to make and break repeatedly as the temperature in said space falls and rises, so as to continue to deliver heated air to said space as long the temperature in the warm air chamber is above the predetermined temperature at which the furnace thermostat is operative to open the furnace thermostat switch.

7. In a heating system, a warm air furnace including a fuel burner and a warm air chamber within which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch opening upon the temperature in said warm air chamber falling to a second value no greater than said first value, a blower for blowing the warm air from said warm air chamber through a space to be heated by said warm air, a space thermostat in said space to be heated, said space thermostat including a plurality of sets of contacts that make in a predetermined sequence and break in reverse order to the order of make in response, respectively, to falling and rising temperatures affecting said thermostat, a source of electric power for operating said heater and said blower, said heater and said blower each being connected to said source of power by a separate electric circuit having a control switch therein, said furnace thermostat switch being in said electric circuit for said blower, means, operative upon the making of the first of said predetermined sequence of the sets of contacts that make, for closing a control circuit that operates the control switch in said blower circuit, means, operative upon the making of the last of said predetermined sequence of the sets of contact that make, for closing of a control circuit that operates the burner switch and for preparing a holding circuit, said holding circuit being operative to keep the control switch in said burner circuit and the holding circuit prepared after said last set of contacts of said predetermined sequence breaks, said holding circuit including therein an additional set of contacts on said space thermostat, other than said last set of contacts to make in said predetermined sequence, a heater in said holding circuit positioned adjacent the space thermostat and operative to cause said thermostat to respond thereto to break a plurality of said control circuits which have a set of space thermostat contacts interposed therein, a signal-light for showing when the burner circuit is closed, a circuit for the burner signal-light including a burner signal-light switch for opening and closing said circuit, said burner signal-light switch operating to opened and closed positions simultaneously with the control switch for the burner circuit, a signal-light for showing when the blower circuit is closed, and a circuit for the blower signal-light including a resistance in the blower circuit between the furnace thermostat and the blower, said blower signal-light circuit being shunted around said resistance.

8. In a heating system, a warm air furnace including a fuel burner and a warm air chamber within which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch opening upon the temperature in said warm air chamber falling to a second value no greater than said first value, a blower for blowing the warm air from said warm air chamber through a space to be heated by said warm air, a space thermostat in said space to be heated, said space thermostat including a plurality of sets of contacts that make in a predetermined sequence and break in reverse order to the order of make in response, respectively, to falling and rising temperatures affecting said thermostat, a source of electric power for operating said heater and said blower, said heater and said blower each being connected to said source of power by a separate electric circuit having a control switch therein, said furnace thermostat switch being in said electric circuit for said blower, means, operative upon the making of the first of said predetermined sequence of the sets of contacts that make, for closing a control circuit that operates the control switch in said blower circuit, means, operative upon the making of the last of said predetermined sequence of the sets of contacts that make, for closing of a control circuit that operates the burner switch and for preparing a holding circuit, said holding circuit being operative to keep the control switch in said burner circuit and the holding circuit prepared after said last set of contacts of said predetermined sequence breaks, said holding circuit including therein an additional set of contacts on said space thermostat, other than said last set of contacts to make in said predetermined sequence, a heater in said holding circuit positioned adjacent the space thermostat and operative to cause said thermostat to respond thereto to break a plurality of said control circuits which have a set of space thermostat contacts interposed therein, a signal-light for showing when the burner circuit is closed, a circuit for the burner signal-light including a burner signal-light switch for opening and closing said circuit, said burner signal-light switch operating to opened and closed positions simultaneously with the control switch for the burner circuit, a signal-light for showing when the blower circuit is closed, and a circuit for the blower signal-light including a switch operatively associated with the temperature measuring element of the furnace thermostat.

9. In a heating system, a warm air furnace including a fuel burner and a warm air chamber within which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch opening upon the temperature in said warm air chamber falling to a second value no greater than said first value, a blower for blowing the warm air from said warm air chamber through a space to be heated by said warm air, a space thermostat in said space to be heated, said space thermostat including a plurality of sets of contacts that make in a predetermined sequence and break in reverse order to the order of make in response, respectively, to falling and rising temperatures affecting said thermostat, a source of electric power for operating said heater and said blower, said heater and said blower each being connected to said source of power by a separate electric circuit having a control switch therein, said furnace thermostat switch being in said electric circuit for said blower, means, operative upon the making of the first of said predetermined sequence of the sets of contacts that make, for closing a control circuit that operates the control switch in said blower circuit, means, operative upon the making of the last of said predetermined sequence of the sets of contacts that make, for closing of a control circuit that operates the burner switch and for preparing a holding circuit, said holding circuit being operative to keep the control switch in said burner circuit and the holding circuit prepared after said last set of contacts of said predetermined sequence breaks, said holding circuit including therein an additional set of contacts on said space thermostat, other than said last set of contacts to make in said predetermined sequence, a heater in said holding circuit positioned adjacent the space thermostat and operative to cause said thermostat to rspond thereto to break a plurality of said control circuits which have a set of space thermostat contacts interposed therein, a signal-light for showing when the burner circuit is closed, a circuit for the burner signal-light including a burner signal-light switch for opening and closing said circuit, said burner signal-light switch operating to opened and closed positions simultaneously with the control switch for the burner circuit, a signal-light for showing when the blower circuit is closed, and a circuit for the blower signal-light including a blower signal-light switch operating to opened and closed positions simultaneously with the control switch for the blower circuit.

10. In a heating system, a warm air furnace including a fuel burner and a warm air chamber within which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch opening upon the temperature in said warm air chamber falling to a second value no greater than said first value, a blower for blowing the warm air from said warm air chamber through a space to be heated by said warm air, a space thermostat in said space to be heated, said space thermostat including a plurality of sets of contacts that make in a predetermined sequence and break in reverse order to the order of make in response, respectively, to falling and rising temperatures affecting said thermostat, a source of electric power for operating said heater and said blower, said heater and said blower each being connected to said source of power by a separate electric circuit having a control switch therein, said furnace thermostat switch being in said electric circuit for said blower, means, operative upon the making of the first of said predetermined sequence of the sets of contacts that make, for closing a control circuit that operates the control switch in said blower circuit, means, operative upon the making of the last of said predetermined sequence of the sets of contacts that make, for closing of a control circuit that operates the burner switch and for preparing a holding circuit, said holding circuit being operative to keep the control switch in said burner circuit and the holding circuit prepared after said last set of contacts of said predetermined sequence breaks, said holding circuit including therein an additional set of contacts on said space thermostat, other than said last set of contacts to make in said predetermined sequence, a heater in said holding circuit positioned adjacent the space thermostat and operative to cause said thermostat to respond thereto to break a plurality of said control circuits which have a set of space thermostat contacts interposed therein, a signal-light for showing when the burner circuit is closed, a circuit for the burner signal-light including a burner signal-light switch for opening and closing said circuit, said burner signal-light switch operating to opened and closed positions simultaneously with the control switch for the burner circuit, a signal-light for showing when the blower circuit is closed, a circuit for the blower signal-light including a blower signal-light switch operating to opened and closed positions simultaneously with the control switch for the blower circuit, and a second blower signal-light switch operatively associated with the temperature measuring element of the furnace thermostat.

11. In a heating system, a warm air furnace including a fuel burner and a warm air chamber in which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch being opened upon the temperature in said warm air chamber falling to a second value no greater than said first value, a blower for blowing the warm air from said warm air chamber through a space to be heated by said warm air, a space thermostat in said space to be heated, a pair of control circuits having said space thermostat interposed therein, said space thermostat including two sets of contacts that make and break in reverse order in response to falling and rising temperatures affecting said thermostat, said sets of contacts being interposed in said pair of control circuits to make and break said control circuits, a source of electric power for energizing said control circuits and for operating said heater and said blower, said heater and said blower each being connected to said source of power by means of separate electric circuits, the electric circuits for said heater and said blower each having a control switch therein, said furnace thermostat switch being in the electric circuit for said blower, means operative upon the first set of contacts of said space thermostat being made for closing the control switch in said blower circuit, and means operative upon the second set of contacts of said space thermostat being made for closing the control switch in said burner circuit.

12. In a heating system, a warm air furnace including a fuel burner and a warm air chamber in which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch being opened upon the temperature in said warm air chamber falling to a second value no greater than said first value, a blower for blowing the warm air from said warm air chamber through a space to be heated by said warm air, a space thermostat in said space to be heated, said space thermostat including two sets of contacts that make and break in reverse order in response to falling and rising temperatures affecting said thermostat, a source of electrical power connected to said space thermostat for operating said heater and said blower, said heater and said blower each being connected to said source of power by means of separate electric circuits, the electric circuits for said heater and said blower each having one of said pair of spaced contacts therein, said furnace thermostat switch being in the electric circuit for said blower, means operative upon the first set of contacts of said space thermostat being made for preparing said blower circuit, said blower circuit being completed upon said switch being closed by the furnace thermostat, and means operative upon the second set of contacts of said space thermostat being made for completing said burner circuit.

13. In a heating system, a warm air furnace including a fuel burner and a warm air chamber within which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch opening upon the temperature in said warm air chamber falling to a second value no greater than said first value, a blower for blowing the warm air from said warm air chamber through a space to be heated by said warm air, a space thermostat in said space to be heated, said space thermostat including a plurality of sets of contacts that make in a predetermined sequence and break in reverse order to the order of make in response, respectively, to falling and rising temperatures affecting said thermostat, a source of electric power for operating said heater and said blower, said heater and said blower each being connected to said source of power by a separate electric circuit having a control switch therein, said furnace thermostat switch being in the electric circuit for said blower, a plurality of control circuits having said space thermostat interposed therein, said control circuits each having at least one of said sets of contacts therein, means including said source of power for energizing said control circuits, means operative, upon the making of the first of said predetermined sequence of the sets of contacts that make, for closing a control circuit that operates the control switch in said blower circuit, means operative, upon the making of the last of said predetermined sequence of the sets of contacts that make, for closing of a control circuit that operates the burner switch and for preparing a holding circuit, said holding circuit being operative to keep the control switch in said burner circuit and the holding circuit prepared after said last set of contacts of said predetermined sequence breaks, said holding circuit including therein a set of contacts on said space thermostat, other than said last set of contacts to make in said predetermined sequence, and a heater in said holding circuit positioned adjacent the space thermostat and operative, upon said holding circuit being energized, to cause said thermostat to respond thereto to break at least one of said control circuits which have a set of space thermostat contacts interposed therein.

14. In a heating system, a warm air furnace including a fuel burner and a warm air chamber within which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch opening upon the temperature in said warm air chamber falling to a second value no greater than said first value, a blower for blowing the warm air from said warm air chamber through a space to be heated by said warm air, a space thermostat in said space to be heated, said space thermostat including a plurality of sets of contacts that make in a predetermined sequence and break in reverse order to the order of make in response, respectively, to falling and rising temperatures affecting said thermostat, a source of electric power for operating said heater and said blower, said heater and said blower each being connected to said source by power by a separate electric circuit having a control switch therein, said furnace thermostat switch being in said electric circuit for said blower, means operative, upon the making of the first of said predetermined sequence of the sets of contacts that make, for closing a control circuit that operates the control switch in said blower circuit, means operative, upon the making of the last of said predetermined sequence of the sets of contacts that make, for closing of a control circuit that operates the burner switch and for preparing a holding circuit, said holding circuit being operative to keep the control switch in said burner circuit and the holding circuit prepared after said last set of contacts of said predetermined sequence breaks, said holding circuit including therein a set of contacts on said spaced thermostat, other than said last set of contacts to make in said predetermined sequence, a heater in said holding circuit positioned adjacent the space thermostat and operative, upon said holding circuit being energized, to cause said thermostat to respond thereto to break at least one of said control circuits which have a set of space thermostat contacts interposed therein, and means for selectively varying the amount and rate of heat produced by the heater in the holding circuit, whereby said heater is operative to either turn off the burner alone, or the burner and the blower substantially simultaneously together, upon the temperature in said space reaching a predetermined level.

15. In a heating system, a warm air furnace including a fuel burner and a warm air chamber within which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch opening upon the temperature in said warm air chamber falling to a second value no greater than said first value, a blower for blowing the warm air from said warm air chamber through a space to be heated by said warm air, a space thermostat in said space to be heated, said space thermostat including a plurality of sets of contacts that make in a predetermined sequence and break in reverse order to the order of make in response, respectively, to falling and rising temperatures affecting said thermostat, a source of electric power for operating said heater and said blower, said heater and said blower each being connected to said source of power by a separate electric circuit having a control switch therein, said furnace thermostat switch being in said electric circuit for said blower, means operative, upon the making of the first of said predetermined sequence of the sets of contacts that make, for closing a control circuit that operates the control switch in said blower circuit, means operative, upon the making of the last of said predetermined sequence of the sets of contacts that make, for closing of a control circuit that operates the burner switch and for preparing a holding circuit, said holding circuit being operative to keep the control switch in said burner circuit and the holding circuit prepared after said last set of contacts of said predetermined sequence breaks, said holding circuit including therein a set of contacts on said space thermostat, other than said last set of contacts to make in said predetermined sequence, a heater in said holding circuit positioned adjacent the space thermostat and operative, upon said holding circuit being energized, to cause said thermostat to respond thereto to break at least one of said control circuits which have a set of space thermostat contacts interposed therein, a first signal-light operatively associated with said burner circuit for showing when the burner circuit is closed, and a second signal-light operatively associated with said blower circuit for showing when the blower circuit is closed.

16. In a heating system, a warm air furnace including a fuel burner and a warm air chamber within which heated air may be stored, a furnace thermostat having a temperature measuring element responsive to the temperature in said warm air chamber, and a switch operatively associated with said temperature measuring element, said switch being closed upon the temperature in said warm air chamber being elevated to a first value, and said switch opening upon the temperature in said warm air chamber falling to a second value no greater than said first value, a blower for blowing the warm air from said warm air chamber through a space to be heated, a space thermostat in said space to be heated, said space thermostat including two sets of contacts that make and break in reverse order in response, respectively, to falling and rising temperatures affecting said thermostat, a source of electric power for operating said heater and said blower, said heater and said blower being connected to said source of power by separate electric circuits, the first set of said two sets of contacts of said space thermostat being in the circuit for said blower and the second set of contacts being in the electric circuit for said burner, said furnace thermostat switch being in the electric circuit for said blower, means operative, upon the first set of contacts of said space thermostat being made, for closing, in part, said blower circuit, means operative, upon the second set of contacts of said space thermostat being made, for closing the burner circuit, said second set of contacts being broken upon the temperature in said space being elevated to a first predetermined level, said first set of contacts being broken upon the temperature in said space being elevated to a second predetermined level above said first predetermined level at which the second set of contacts break, the firs set of contacts being operative thereafter to make and break repeatedly as the temperature in said space falls and rises, so as to continue to deliver heater air to said space as long as the temperature in the warm air chamber is above the predetermined temperature at which the furnace thermostat is operative to open the furnace thermostat switch, a first signal-light operatively associated with said burner circuit for showing when the burner circuit is closed, and a second signal-light operatively associated with said blower circuit for showing when the blower circuit is closed.

17. A method of operating a heating system, which heating system comprises a furnace, a burner for heating air in said furnace, a bonnet for storing heated air therein, and a blower for blowing warm air from the bonnet to a space to be heated; said method comprising the steps of initiating operation of said burner when the temperature in said space to be heated falls below a first predetermined level, then initiating operation of said blower when the temperature of the heated air in said bonnet rises to a predetermined heated-air level, then continuing to heat air in said furnace at a rate greater than the rate at which the blower delivers the heated air to said space to be heated, whereby an excess of heated air is accumulated in said bonnet, then simultaneously shutting off the operation of both the burner and the blower upon the temperature in said space to be heated rising to a second predetermined level, and then cycling the blower on and off in response respectively to falling and rising temperatures in said space to be heated, without turning on the burner, as long as the temperature in said bonnet remains above said predetermined heated-air level.

18. A method of operating a heating system, which heating system comprises a furnace, a burner for heating air in said furnace, a bonnet for storing heated air therein, and a blower for blowing warm air from the bonnet to a space to be heated; said method comprising the steps of initiating operation of said burner when the temperature in said space to be heated falls below a first predetermined level, then initiating operation of said blower when the temperature of the heated air in said bonnet rises to a predetermined heated-air level, accumulating heated air in said bonnet while the blower is delivering a portion of said heated air to the space to be heated, then substantially simultaneously shutting off the operation of both the burner and the blower when the temperature in said space to be heated rises to a second predetermined level, and then cycling the blower on and off in response respectively to temperatures falling and rising below and above a third predetermined level in said space to be heated, without turning on the burner, as long as the temperature in said bonnet remains above said predetermined heated-air level.

19. A method of operating a heating system, which heating system comprises a furnace, a burner for heating air in said furnace, a bonnet for storing heated air therein, and a blower for blowing warm air from the bonnet to a space to be heated; said method comprising the steps of initiating operation of said burner when the temperature in said space to be heated falls below a first predetermined level, then initiating operation of said blower when the temperature of the heated air in said bonnet rises to a predetermined heated-air level, then continuing to heat air in said furnace at a rate greater than the rate at which the blower delivers the heated air to said space to be heated, whereby an excess of heated air is accumulated in said bonnet, then shutting off the operation of the burner when the temperature in said space to be heated rises to a second predetermined level higher than said first predetermined temperature level, then, shortly after shutting off the operation of said burner, shutting off the operation of said blower when the temperature in said space to be heated rises to a third predetermined level which is higher than both said first and second predetermined temperature levels, and then cycling the blower on and off in response respectively to temperatures falling and rising below and above said third predetermined level in said space to be heated, without turning on the burner, as long as the temperature in said bonnet remains above said predetermined heated-air level.

20. A method of operating a heating system, which heating system comprises a furnace, a burner for heating air in said furnace, a bonnet for storing heated air therein, and a blower for blowing warm air from the bonnet to a space to be heated; said method comprising the steps of initiating operation of said burner when the temperature in said space to be heated falls below a first predetermined level, then initiating operation of said blower when the temperature of the heated air in said bonnet rises to a predetermined heated-air level, accumulating heated air in said bonnet while the blower is delivering a portion of said heated air to the space to be heated, continuing the operation of said burner and said blower as the temperature in said space to be heated rises above said first predetermined level, there being induced in the heated air being delivered by said blower an inertia of flow, then substantially simultaneously shutting off the operation of both the burner and the blower upon the temperature in said space to be heated rising to a second predetermined level which is higher than said first predetermined temperature level and is slightly less than a third predetermined temperature level, which it is desired to achieve in said space to be heated, the temperature in said space to be heated then rising to said third predetermined temperature by reason of the supplying of additional heated air under the inertia of flow of heated air induced by the blower, and then cycling the blower on and off in response respectively to temperatures falling and rising below and above said third predetermined level in said space to be heated, without turning on the burner, as long as the temperature in said bonnet remains above said predetermined heated-air level.

References Cited in the file of this patent

UNITED STATES PATENTS

| Number | Name | Date |
|---|---|---|
| 1,945,804 | Dicke | Feb. 6, 1934 |
| 1,951,663 | Kriechbaum | Mar. 20, 1934 |
| 2,170,310 | Shivers | Aug. 22, 1939 |
| 2,240,003 | McGrath | Apr. 29, 1941 |